(12) United States Patent
Moore et al.

(10) Patent No.: US 6,716,534 B2
(45) Date of Patent: Apr. 6, 2004

(54) COATING COMPOSITION COMPRISING A FLUOROCHEMICAL POLYETHER SILANE PARTIAL CONDENSATE AND USE THEREOF

(75) Inventors: George G. I. Moore, Afton, MN (US); Rudolf J. Dams, Zwijndrecht (BE); Franceska M. Fieuws, Destelbergen (BE); Guido P. Piessens, Mechelen (BE)

(73) Assignee: 3M Innovative Properties Company, St. Paul, MN (US)

( * ) Notice: Subject to any disclaimer, the term of this patent is extended or adjusted under 35 U.S.C. 154(b) by 30 days.

(21) Appl. No.: 10/007,556

(22) Filed: Nov. 8, 2001

(65) Prior Publication Data

US 2003/0138643 A1 Jul. 24, 2003

(51) Int. Cl.⁷ ................................................ B32B 25/20
(52) U.S. Cl. ........................ 428/447; 528/901; 528/401; 528/42; 528/12; 528/25; 528/36; 528/425; 568/677; 525/403; 525/474; 525/475; 525/477; 556/458; 427/387; 524/588; 524/612
(58) Field of Search ................................. 528/901, 401, 528/42, 12, 25, 36, 425; 568/677; 428/447; 525/474, 475, 477; 556/458; 427/387; 524/588, 612

(56) References Cited

U.S. PATENT DOCUMENTS

| | | | |
|---|---|---|---|
| 3,810,874 A | 5/1974 | Mitsch et al. | |
| 4,024,306 A | 5/1977 | Takamizawa et al. | |
| 4,687,707 A | 8/1987 | Matsuo et al. | |
| 5,274,159 A | 12/1993 | Pellerite et al. | |
| 5,306,758 A | 4/1994 | Pellerite | |
| 5,578,278 A | 11/1996 | Fall et al. | |
| 5,644,014 A | 7/1997 | Schmidt et al. | |
| 5,658,962 A | 8/1997 | Moore et al. | |
| 5,739,369 A | 4/1998 | Matsumura et al. | |
| 5,919,886 A | 7/1999 | Matsuda et al. | |
| 5,922,787 A | 7/1999 | Kondo et al. | |
| 6,054,601 A | 4/2000 | Standke et al. | |
| 6,183,872 B1 | * 2/2001 | Tanaka et al. | |
| 6,221,434 B1 | 4/2001 | Visca et al. | |
| 6,273,348 B1 | 8/2001 | Shouji et al. | |

FOREIGN PATENT DOCUMENTS

| | | |
|---|---|---|
| EP | 0 166 363 | 8/1991 |
| EP | 0 433 070 | 1/1996 |
| EP | 0 797 111 | 9/1997 |
| EP | 0 933 377 | 8/1999 |
| EP | 0 978 524 | 2/2000 |
| EP | 0 738 771 | 7/2001 |
| GB | 2 218 097 | 11/1989 |
| WO | WO 99/03941 | 1/1999 |

OTHER PUBLICATIONS

"Tailoring Surfaces with Silanes", ChemTech, Dec. 1977, pp. 766–778, vol. 7.

U.S. patent application Ser. No. 10/010144, filed Nov. 8, 2001, Coating Composition Comprising Fluorochemical Polyether Silane Polycondensate and use thereof.

\* cited by examiner

*Primary Examiner*—Kuo-Liang Peng
(74) *Attorney, Agent, or Firm*—Kent S. Kokko

(57) ABSTRACT

A composition comprising a least one fluorochemical polyether silane compound having a polyfluoropolyether segment and at least two hydrolysable silane groups per molecule, one or more non-fluorinated compounds having at least two hydrolysable groups per molecule, and/or a partial condensate thereof, is disclosed. The composition provides durable water, oil and stain repellency to a substrate.

15 Claims, No Drawings

COATING COMPOSITION COMPRISING A FLUOROCHEMICAL POLYETHER SILANE PARTIAL CONDENSATE AND USE THEREOF

The present invention relates to a composition comprising at least one fluorochemical polyether silane compound having a polyfluoropolyether segment and at least two hydrolysable silane groups per molecule with one or more non-fluorinated compounds having at least two hydrolysable groups per molecule. The present invention also relates to a composition comprising a partial condensate resulting from a partial condensation reaction between the fluorochemical polyether silane compound having a polyfluoropolyether segment and at least two hydrolysable silane groups per molecule with one or more non-fluorinated compounds having at least two hydrolysable groups per molecule. The present invention also relates to the use of the compositions for providing durable repellency to water, oil and stain to a substrate.

In the past, various efforts have been made to provide repellent properties to a substrate. For example, U.S. Pat. No. 4,687,707 (=EP-A-0 166 363) describes a low reflectance, transparent material having anti-soiling properties, which comprises a transparent substrate having a coating comprising a thin layer of a condensation product of a fluorine containing silicon compound having a polyfluorinated or perfluorinated carbon chain.

WO 99/03941 relates to a coating material comprising condensates of at least one compound (A) of the general formula $R_aMZ_b$ (a=0 to 3; b=1 to 4; a+b=3, 4), and at least one compound (B) of the general formula $R'_xMZ_y$ (x=1 to 3; y=1 to 3; x+y=3,4), wherein R is a non-hydrolysable organic group, M is an element selected from the main groups III to V or from the subgroups II to IV of the periodic table of elements, Z is a hydrolysable group, and at least one R' contains a perfluoropolyether structure separated from M by at least two atoms, and at least one R is not equal to at least one R'. The composition is used to provide oleophobic properties to substrates, such as porous polymers.

U.S. Pat. No. 5,739,369 (=EP-A-0 738 771) relates to a water-soluble surface treating agent comprising the reaction product of (A) a fluoroalkyl group-containing alkoxysilane with (B) an amino-group-containing alkoxysilane and optionally further with (C) an alkyl group-containing alkoxysilane. The agent is diluted with water to form a solution for treating glass and other substrates to impart thereto properties, such as water repellency.

U.S. Pat. No. 5,919,886 relates to a fluorine-containing organo-silicon compound useful for obtaining elastomers and to room temperature curable silicon compositions containing the same compound.

U.S. Pat. No. 5,306,758 (=EP-A-0 433 070) describes fluorocarbon based, curable, crosslinkable compositions and coatings prepared therefrom that can be used to form low-surface energy release liners.

U.S. Pat. No. 5,922,787 (=EP-0 797 111) relates to a composition containing an alkoxy-silane compound having a perfluoropolyether group. The composition may be used for forming an anti-fouling film.

However, our findings indicate that while some of the previously known surface coatings may be capable of providing acceptable levels of initial repellent properties, a loss of repellency is often encountered due to abrasion of the coating.

Accordingly, it is desirable to provide a coating composition capable of providing a highly durable water, oil and/or stain repellent coating on a substrate. In particular, it is desirable to provide a durable coating wherein the initial, repellent properties are substantially maintained, even under abrading conditions. Further, the coating compositions preferably can be applied and used in an environmental friendly way and can be produced in a reliable, convenient and cost effective way. Additionally, the coatings desirably have a good durability against exposure to UV light, i.e. the repellency properties do not substantially degrade upon exposure to UV light. Furthermore, it is desirable to obtain optically clear coatings in particular when transparent substrates such as glass are to be treated with the compositions. It would also be desirable to obtain the desired repellency properties without the need for subjecting the coated substrate to a heat treatment at elevated temperature.

SUMMARY OF THE INVENTION

In one aspect, the present invention provides a composition comprising (A) one or more fluorochemical polyether silane compound(s) having a polyfluoropolyether segment and at least two silane groups —$Si(Y)_{3-x}(R^1)_x$ per molecule, wherein $R^1$ represents an alkyl group, Y represents a hydrolysable group and x is 0 or 1; and (B) a substantial amount of one or more non-fluorinated compounds of an element M selected from the group consisting of Si, Ti, Zr, B, Al, Ge, V, Pb, Sn and Zn and having at least two hydrolysable groups per molecule. In another aspect the present invention provides the reaction product of (A) and (B).

In a further aspect, the present invention provides a composition derivable from a partial condensation of the above defined composition. By "partial condensation" and "partial condensate" in connection with the present invention is meant that some of the hydrolysable groups in the mixture have reacted while leaving a substantial amount of hydrolysable groups available for a condensation reaction. Typically, a partial condensate means that at least 20%, preferably at least 30%, more preferably at least 50% of the hydrolysable groups are still available for condensation reaction.

In a still further aspect, the present invention also provides a method for treating a substrate, comprising the step of applying to at least a portion of the surface of the substrate the compositions as defined above. The fluorochemical compositions of the present invention can be used to treat substrates and are capable of rendering such substrates oil and water repellent and/or to provide stain repellency thereto.

The compositions are generally effective at low levels of application and have good durability. The compositions are particularly useful for rendering substrates such as ceramics, glass, inox and chromated steel, repellent to water and/or oil.

In a further aspect, the present invention also provides for compositions from which a composition as defined above can be readily prepared. Such compositions comprise components (A) and (B) and are substantially free of water. By substantially free of water is meant that the compositions do not contain water or the amount of water is so low that reaction between components (A) and (B) does not occur in such composition. Preferably, these compositions are also free of acid or base catalyst and will conveniently contain an amount of organic solvent so as to obtain a homogeneous mixture.

By the term "homogeneous mixture" in connection with the present invention is meant that the composition is stable, for at least 24 hours, preferably 1 month, at room temperature. Some haziness may occur, however without substantial precipitation or phase separation occurring.

The term "hydrolysable group" in connection with the present invention refers to a group which either is directly capable of undergoing condensation reactions under appropriate conditions or which is capable of hydrolyzing under appropriate conditions, thereby yielding a compound, which is capable of undergoing condensation reactions. Appropriate conditions include acidic or basic aqueous conditions, optionally in the presence of a condensation catalyst.

Accordingly, the term "non-hydrolysable group" as used in the present invention refers to a group not capable of either directly undergoing condensation reactions under appropriate conditions or of hydrolyzing under the conditions listed above for hydrolyzing the hydrolyzable groups.

The term "substantial amount" of a compound as used herein refers to an amount of a compound greater than a catalytic amount of that compound necessary for promoting a certain reaction (e.g., condensation reactions). Accordingly, a composition comprising a substantial amount of that compound generally allows the compound to act as a reactant such that the resulting product is formed of at least part of that compound.

DETAILED DESCRIPTION

Component (A) comprises at least one fluorochemical polyether silane compound having a polyfluoropolyether segment and at least two silane groups —Si(Y)$_{3-x}$(R$^1$)$_x$ per molecule, wherein R$^1$ represents an alkyl group (for example a C$_1$–C$_8$, preferably C$_1$–C$_4$ primary or secondary alkyl group), Y represents a hydrolysable group and x is 0 or 1.

Preferably, component (A) is a fluorochemical polyether silane compound according to formula (I)

$$R_f[Q—C(R)_2—Si(Y)_{3-x}(R^1)_x]_z \quad \quad (I)$$

wherein R$_f$ represents a multivalent polyfluoropolyether segment, Q represents an organic divalent linking group, R$^1$ represents an alkyl group (preferably containing 1 to 8, more preferably 1 to 4 carbon atoms), Y represents a hydrolysable group; R represents hydrogen or an alkyl group of 1 to 4 carbon atoms and the R groups may be the same or different, x is 0 or 1 and z is 2, 3 or 4. Preferably both R groups are hydrogens.

The hydrolysable groups Y may be the same or different and are generally capable of hydrolyzing under appropriate conditions, for example under acidic or basic aqueous conditions, such that the fluorochemical silane compound can then undergo condensation reactions. Preferably, the hydrolysable groups upon hydrolysis yield groups capable of undergoing condensation reactions, such as silanol groups.

Examples of hydrolysable groups include halide groups, such as chlorine, bromine, iodine or fluorine, alkoxy groups —OR' (wherein R' represents a lower alkyl group, preferably containing 1 to 6, more preferably 1 to 4 carbon atoms and which may optionally be substituted by one or more halogen atoms), acyloxy groups —O(CO)—R" (wherein R" represents a lower alkyl group, preferably containing 1 to 6, more preferably 1 to 4 carbon atoms, which may be optionally substituted by one or more halogen atoms), aryloxy groups —OR'" (wherein R'" represents an aryl moiety, preferably containing 6 to 12, more preferably containing 6 to 10 carbon atoms, which may be optionally substituted by one or more substituents independently selected from halogens, and C$_1$–C$_4$ alkyl groups which may optionally be substituted by one or more halogen atoms). In the above formulae R', R", and R'" may include branched structures.

Suitable hydrolysable groups also include polyoxyalkylene groups of the formula $$—O—A—R^3$$

wherein A is a divalent hydrophilic group (a) having the formula $$(CHR^4—CH_2O—)_q$$

wherein q is a number having a value of 1 to 40, preferably 2 to 10, R$^4$ is hydrogen or methyl, and at least 70% of R$^4$ is hydrogen, and R$^3$ independently is hydrogen or a lower alkyl group having 1 to 4 carbon atoms, such as disclosed in U.S. Pat. No. 5,274,159, incorporated herein by reference.

Specific examples of hydrolysable groups include methoxy, ethoxy and propoxy groups, chlorine and an acetoxy group. Particularly preferred hydrolysable groups include C$_1$–C$_4$ alkoxy groups, such as methoxy and ethoxy groups. C$_2$–C$_4$ alkoxy groups are preferred in case it is desired to obtain clear coatings on a substrate.

The divalent polyfluoropolyether group R$_f$ in the above formula (I), representing the fluorinated polyether silane, can include linear, branched, and/or cyclic structures, that may be saturated or unsaturated, and containing one or more caternary oxygen atoms (i.e. one or more non-adjacent —CF$_2$— groups may be replaced by —O— groups). R$_f$ preferably is a perfluorinated group (i.e., all C—H bonds are replaced by C—F bonds). More preferably, it includes perfluorinated repeating units selected from the group of —(C$_n$F$_{2n}$O)—, —(CF(Z)O)—, —(CF(Z)C$_n$F$_{2n}$O)—, —(C$_n$F$_{2n}$CF(Z)O)—, —(CF$_2$CF(Z)O)—, and combinations thereof, wherein the repeating units generally may be randomly, blocky or alternating arranged, and optionally can include —(C$_n$F$_{2n}$)— and —(CF(Z))— units and wherein n in a number from 1 to 12 inclusive, preferably from 1 to 4 inclusive. R$_f$ may also comprise cyclic perfluoro groups, for example cyclic —C$_6$F$_{10}$— groups.

In these repeating units Z is a perfluoroalkyl group, an oxygen-containing perfluoroalkyl group, a perfluoroalkoxy group, or an oxygen-substituted perfluoroalkoxy group, all of which can be linear, branched, or cyclic, and preferably have about 1 to about 9 carbon atoms and 0 to about 4 oxygen atoms. Examples of polyfluoropolyethers containing polymeric moieties made of these repeating units are disclosed in U.S. Pat. No. 5,306,758 (Pellerite).

In one embodiment, approximate average structures for a divalent perfluoropolyether group include —CF$_2$O(CF$_2$O)$_m$ (C$_2$F$_4$O)$_p$CF$_2$—, wherein an average value for m is 0 to about 50 and an average value for p is 0 to about 50, with the proviso that both m and p are not simultaneously 0, —CF(CF$_3$)—(OCF$_2$CF(CF$_3$))$_p$O—R$_f'$—O(CF(CF$_3$)CF$_2$ O)$_p$CF(CF$_3$)—, —CF$_2$ O(C$_2$F$_4$O)$_p$CF$_2$—, and —(CF$_2$)$_3$O (C$_4$F$_8$O)$_p$(CF$_2$)$_3$—, wherein R$_f'$ is a divalent, perfluoroalkylene group containing one or more carbons and optionally caternary O or N. The values of m and p in these approximate average structures can vary. Preferably, an average value of m is within a range of about 1 to about 50, and an average value of p is within a range of about 3 to about 40. As these are polymeric materials, such compounds exist as mixtures upon synthesis, which are suitable for use. The repeat units generally may be positioned in a random, blocked or alternating arrangement.

As synthesized, these structures typically include a mixture of polymeric units. The approximate average structure is the approximate average of the mixture of structures. Further, the distribution of perfluorinated repeating units may be regular or random.

The divalent linking group Q may be the same or different and can include linear, branched, or cyclic structures, that may be saturated or unsaturated, and preferably contains 1 to 15 atoms. The group Q can contain one or more heteroatoms (e.g., oxygen, nitrogen, or sulfur) and/or one or more functional groups (e.g., carbonyl, amide, urethane or sulfonamide). It can also be substituted with one or more halogen atoms (preferably, fluorine atoms), although this is less desirable, as this might lead to instability of the compound. The divalent linking group Q preferably is substantially stable against hydrolysis.

For example, Q may be a saturated or unsaturated hydrocarbon group typically including 1 to 15 carbons atoms. Preferably Q is a linear hydrocarbon group preferably containing 1 to 10 carbon atoms, and optionally containing 1 to 4 heteroatoms and/or 1 to 4 functional groups, and more preferably, containing at least one functional group.

Suitable linking groups Q include the following structures in addition to a covalent bond. For the purposes of this list, each k is independently an integer from 0 to about 20, k' is independently an integer from 0 to 20, preferably from 2 to 12 and most preferably from 2 to 6, $R_1'$ is hydrogen, phenyl, or alkyl of 1 to about 4 carbon atoms, and $R_2'$ is alkyl of 1 to about 20 carbon atoms The compounds of formula (I) can be synthesized using standard techniques. For example, commercially available or readily synthesized perfluoropolyether esters (or function derivative thereof) can be combined with a functionalized alkoxysilane, such as a 3-aminopropylalkoxysilane, according to U.S. Pat. No. 3,810,874 (Mitsch et al.). It will be understood that functional groups other than esters may be used with equal facility to incorporate silane groups into a perfluoropolyether.

In accordance with a particular embodiment of the present invention, such perfluoropolyether esters may be prepared through direct fluorination of a hydrocarbon polyether diester. Direct fluorination involves contacting the hydrocarbon polyether diester with $F_2$. Accordingly, the hydrogen atoms on the hydrocarbon polyether diester will be replaced with fluorine atoms thereby generally resulting in the corresponding perfluoropolyether diester. Direct fluorination methods are disclosed in, for example, U.S. Pat. Nos. 5,578,278 and 5,658,962, which are incorporated herein by reference.

Examples of intermediates suitable for use in the preparation of fluorochemical polyether silanes may be represented by the general formula $R_f$—$X_z$, wherein $R_f$ is as previously defined for Formula I and z is 2, 3 or 4. A

---

—$SO_2NR_1'(CH_2)_kO(O)C$—  —$CONR_1'(CH_2)_kO(O)C$—
—$(CH_2)_kO(O)C$—  —$CH_2CH(OR_2')CH_2O(O)C$—
—$(CH_2)_kC(O)O(CH_2)_{k'}$—  —$(CH_2)_kSC(O)$—
—$(CH_2)_kO(CH_2)_kO(O)C$—  —$(CH_2)_kS(CH_2)_kO(O)C$—
—$(CH_2)_kSO_2(CH_2)_kO(O)C$—  —$(CH_2)_kS(CH_2)_kOC(O)$—
—$(CH_2)_kSO_2NR_1'(CH_2)_kO(O)C$—  —$(CH_2)_kSO_2$—
—$SO_2NR_1'(CH_2)_kO(CH_2)_{k'}$—  —$SO_2NR_1'(CH_2)_k$—
—$(CH_2)_kO(CH_2)_kC(O)O(CH_2)_{k'}$—  —$(CH_2)_kSO_2NR_1'(CH_2)_kC(O)O(CH_2)_{k'}$—
—$(CH_2)_kSO_2(CH_2)_kC(O)O(CH_2)_{k'}$—  —$CONR_1'(CH_2)_kC(O)O(CH_2)_{k'}$—
—$(CH_2)_kS(CH_2)_kC(O)O(CH_2)_{k'}$—  —$CH_2CH(OR_2')CH_2C(O)O(CH_2)_{k'}$—
—$SO_2NR_1'(CH_2)_kC(O)O(CH_2)_{k'}$—  —$(CH_2)_kO(CH_2)_{k'}$—
—$OC(O)NR'(CH_2)_{k'}$—  —$(CH_2)_kNR_1'$—
—$C_kH_{2k}$—$OC(O)NH$—  —$C_kH_{2k}$—$NR_1'C(O)NH(CH_2)_{k'}$—,
—$(CH_2)_kNR_1'C(O)O(CH_2)_{k'}$—, and  —$(CH_2)_k$—

---

Preferred linking groups Q are —$C(O)NH(CH_2)_2$— and —$OC(O)NH(CH_2)_2$—.

Compounds of formula (I) that are conveniently used, generally have a molecular weight of at least about 650, and preferably, at least about 1000. It will be understood, with respect to the description of formula I, that the composition comprises mixtures of compounds and therefore mixtures of molecular weights.

Examples of preferred fluorinated disilanes (A) include, but are not limited to, the following approximate average structures:

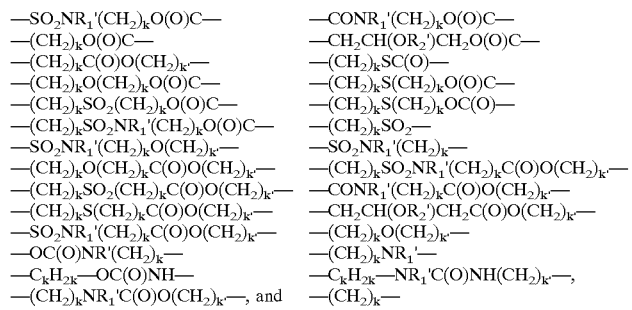

Preferably, in each fluorinated polyether silane, Q contains a nitrogen atom. More preferably, at least one Q—$CR_2$—$Si(Y)_{3-x}(R^1)_x$ group per molecule is $C(O)NH(CH_2)_3Si(OR)_3$ or $OC(O)NH(CH_2)_3Si(OR)_3$ (wherein R is methyl, ethyl, polyethyleneoxy or mixtures thereof).

particularly useful intermediate may represented by the general formula

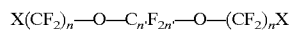

where n is in the range of 1 to 6, and preferably in the range of 1 to 3; n' is in the range of 5 to 12, and preferably in the range of 5 to 7, X is selected from the group consisting of —COOH, —$COOM_{1/v}$, —$COONH_4$, —COOR, —$CH_2OH$, —COF, —COCl, —COR, CONR'R', —$CH_2NH_2$, —$CH_2NCO$, —CN, —$CH_2OSO_2R$, —$CH_2OCOR$, —OC$(O)CH_3$, —$CH_2OCOCR'$=$CH_2$, —$CONH(CH_2)_mSi(OR)_3$, and —$CH_2O(CH_2)_mSi(OR)_3$;

where M is a metal atom having a valence "v" of 1 to 4, each R is independently selected from the group consisting of alkyl groups having from 1 to 14 carbon atoms, fluoroalkyl groups having from 1 to 14 carbon atoms, aryl groups having from 6 to 10 ring-carbon atoms, and heteroatom-containing groups having from 1 to 14 carbon atoms, and m is an integer in the range from 1 to 11; R' is independently H or R with the proviso R' is not a fluoroalkyl group.

Specific structures are exemplified by:

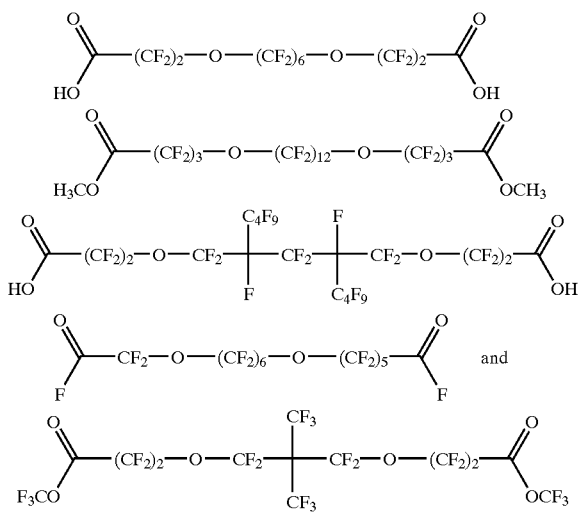

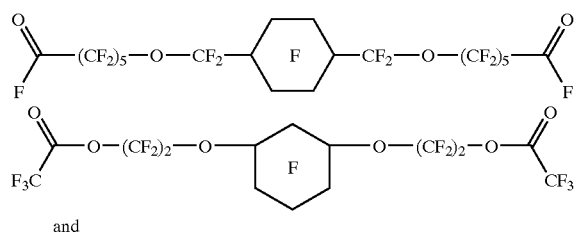

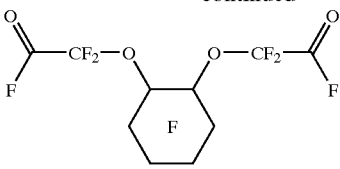

It will be understood with respect to the above novel structures, that other functional groups may be substituted for those depicted. For examples, the —$CO_2H$ group may be substituted by —$COOM_{1/v}$, —$COONH_4$, —COOR, —$CH_2OH$, —COF, —COCl, —COR, CONR'R', —$CH_2NH_2$, —$CH_2NCO$, —CN, —$CH_2OSO_2R$, —$CH_2OCOR$, —OC(O)$CH_3$, —$CH_2OCOCR'$=$CH_2$, —CONH$(CH_2)_m$Si$(OR)_3$, and —$CH_2O(CH_2)_m$Si$(OR)_3$ as previously described.

An additional embodiment is a composition comprising

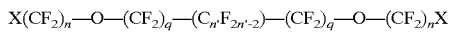

where n is in the range of 1 to 6, and preferably in the range of 1 to 3; $C_{n'}F_{2n'-2}$ represents a cycloalkylene moiety where n' is in the range of 5 to 12, and preferably in the range of 6 to 8, X is selected from the group consisting of —COOH, —$COOM_{1/v}$, —$COONH_4$, —COOR, —$CH_2OH$, —COF, —COCl, —COR', CONR'R', —$CH_2NH_2$, —$CH_2NCO$, —CN, —$CH_2OSO_2R$, —$CH_2OCOR$, —OC(O)$CH_3$, —$CH_2OCOCR'$=$CH_2$, —CONH$(CH_2)_m$Si$(OR)_3$, —$CH_2O$ $(CH_2)_m$Si$(OR)_3$; where M is a metal atom having a valence "v" of 1 to 4, each R is independently selected from the group consisting of alkyl groups having from 1 to 14 carbon atoms, fluoroalkyl groups having from 1 to 14 carbon atoms, aryl groups having from 6 to 10 ring-carbon atoms, and heteroatom-containing groups having from 1 to 14 carbon atoms, q is 0 or 1, and m is an integer in the range from 1 to 11; R' is independently H or R with the proviso R' is not a fluoroalkyl group.

Specific perfluorinated cycloalkylene-containing structures are exemplified by:

and

In an alternative method, perfluoropolyetherdiols can be reacted with a functionalized alkoxysilane, such as 3-trimethoxysilylpropylisocyanate. Modifications of this method are described in the Examples. Such materials may or may not need to be purified before use in a treatment composition.

In the present invention, mixtures of compounds (A) and/or mixtures of compounds (B) may be used.

Component (B) as used in the present invention comprises one or more non-fluorinated compounds of an element M selected from the group consisting of Si, Ti, Zr, B, Al, Ge, V, Pb, Sn and Zn having at least two hydrolysable groups per molecule. Preferably, the hydrolysable groups are directly bonded to the element M.

In one embodiment of the present invention, component (B) comprises a compound according to the formula (II)

$$(R^2)_qM(Y^1)_{p-q} \qquad (II)$$

wherein $R^2$ represents a non-hydrolysable group, M represents an element of valency p+q, selected from the group consisting of Si, Ti, Zr, B, Al, Ge, V, Pb, Sn and Zn, p is 3 or 4 depending on the valence of M, q is 0, 1 or 2, and $Y^1$ represents a hydrolysable group.

The hydrolysable groups present in component (B) may be the same or different and are generally capable of hydrolyzing under appropriate conditions, for example under acidic or basic aqueous conditions, such that component (B) can undergo condensation reactions. Preferably, the hydrolysable groups upon hydrolysis yield groups capable of undergoing condensation reactions, such as hydroxyl groups.

Typical and preferred examples of hydrolysable groups include those as described with respect to component (A). Preferably, component (B) includes tetra-, tri- or dialkoxy (preferably containing 1 to 4 carbon atoms) compounds.

The non-hydrolysable groups $R^2$ may be the same or different and are generally not capable of hydrolyzing under the conditions listed above. For example, the non-hydrolysable groups $R^2$ may be independently selected from a hydrocarbon group, for example a $C_1$–$C_{30}$ alkyl group, which may be straight chained or branched and may include one or more aliphatic, cyclic hydrocarbon structures, a $C_6$–$C_{30}$ aryl group (optionally substituted by one or more substituents selected from halogens and $C_1$–$C_4$ alkyl groups), or a $C_7$–$C_{30}$ aralkyl group.

In one embodiment the non-hydrolysable groups $R^2$ are independently selected from a hydrocarbon group, for example a $C_1$–$C_{30}$ alkyl group and a $C_6$–$C_{20}$ aryl group (optionally substituted by one or more substituents selected from halogens and $C_1$–$C_4$ alkyl groups).

Preferred compounds (B) include those in which M is Ti, Zr, Si and Al. Representative examples of component (B) include tetramethoxysilane, tetra ethoxysilane, methyl triethoxysilane, dimethyldiethoxysilane, octadecyltriethoxysilane, methyl trichlorosilane, tetramethyl orthotitanate, tetra ethyl orthotitanate, tetra-iso-propyl orthotitanate, tetra-n-propyl orthotitanate, tetraethyl zirconate, tetra-iso-propyl zirconate tetra-n-propyl zirconate and the like. More preferred compounds include $C_1$–$C_4$ alkoxy derivatives of Si, Ti and Zr. Particularly preferred compounds (B) include tetraethoxysilane. Single compounds or mixtures of compounds (B) may be used.

Optionally, the composition may comprise one or more crosslinking agents (C), in order to further increase the durability of the coating. Component (C) may be selected from compounds with additional functionality from those of components (A) and (B). For example, component (C) may comprise a compound of an element Ml that is selected from the group consisting of Si, Ti, Zr, B, Al, Ge, V, Pb, Sn and Zn having at least one hydrolysable group and at least one reactive functional group per molecule that is capable of engaging in a crosslinking reaction. Preferably, said at least one hydrolysable group is directly bonded to the element $M^1$.

Suitable and preferred hydrolysable groups include those groups mentioned with respect to component (A). If component (C) includes more than one hydrolysable groups, these may be the same or different. Particularly preferred hydrolysable groups are selected from $C_1$–$C_4$ alkoxy groups, such as methoxy, ethoxy, iso- and (preferably) n-propoxy, or iso- and (preferably) n-butoxy groups.

The reactive functional group is a group which is capable of engaging in a crosslinking reaction so as to provide further crosslinking functionality to the polycondensation product that can be obtained from components (A), (B) and (C). The crosslinking reaction may involve for example irradiation, heating or a combination thereof. If component (C) includes more than one reactive functional groups, these groups may be the same or different. Of these, free radically polymerizable groups, such as vinyl, acrylate or methacrylate groups, are particularly preferred reactive functional groups.

A preferred crosslinking agent can be represented by formula (IV):

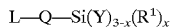

$$L\text{—}Q\text{—}Si(Y)_{3-x}(R^1)_x$$

wherein
L represents a reactive functional group that may react by condensation or addition reactions such as an amino group, an epoxy group, a mercaptan or an anhydride group or by free-radical polymerization; and
Q, Y and $R^1$ are as described for formula I, and x is 0, 1 or 2.

For formula V, preferably Q is an alkylene (preferably containing 1 to 10, more preferably containing 1 to 6 carbon atoms), an arylene (preferably containing 6 to 20 carbon atoms which may be substituted by one or more $C_1$–$C_4$ alkyl groups, halogen atoms or mixtures thereof), an oxyalkylene group of the formula (—O—R—)$_n$, wherein R is independently selected from a divalent, straight chained or branched lower alkyl group (preferably containing 1 to 6 carbon atoms) and n is an integer from 1 to 20.

For formula IV, preferably $R^1$ independently represents an alkyl group, preferably a $C_1$–$C_8$ alkyl group (such as methyl, ethyl or propyl) or an $C_1$–$C_8$ alkyl group containing a cyclic hydrocarbon structure (such as cycloalkyl such as cyclohexyl or cyclopentyl), an aryl group (preferably containing 6 to 20 carbon atoms which may optionally be substituted by one or more $C_1$–$C_4$ alkyl groups or halogens or mixtures thereof, such as phenyl), an alkylaryl group (preferably containing 7 to 12 carbon atoms) or an aralkyl group (preferably containing 7 to 12 carbon atoms).

For formula IV, Y is hydrolysable group. Suitable and preferred examples of hydrolysable groups include those groups as mentioned with respect to component (A), formula I. Particularly preferred hydrolysable groups include alkoxy groups (preferably containing 1 to 4 carbon atoms), such as methoxy and ethoxy groups.

Particularly preferred reactive compounds according to formula (IV), in which the reactive functional group L is one that reacts by addition or condensation reactions, include epoxypropyltrimethoxysilane), bis(3-aminopropyl-trimethoxysilyl)amine and aminopropyltrimethoxysilane.

Alternatively L may be a reactive functional group that is a free radically polymerizable group that typically contains an ethylenically unsaturated group capable of undergoing a free radical polymerization. Suitable free radically polymerizable groups L include, for example, moieties derived from vinyl ethers, vinyl esters, allyl esters, vinyl ketones, styrene, vinyl amide, acrylamides, maleates, fumarates, acrylates and methacrylates. Of these, the esters and amides of alpha, beta unsaturated acids, such as the acrylates and methacrylates are preferred.

Where L is a free radically polymerizable group the organic divalent linking group Q may contain from 1 to about 20, preferably from 1 to 10 carbon atoms. Q can optionally contain oxygen, nitrogen, or sulfur-containing groups or a combination thereof. Examples of suitable linking groups Q include straight chain, branched chain or cyclic alkylene (preferably containing 2 to 20 carbon atoms), arylene (preferably containing 6 to 20 carbon atoms), aralkylene (preferably containing 7 to 20 carbon atoms), oxyalkylene, carbonyloxyalkylene, oxycarboxyalkylene, carboxyamidoalkylene, urethanylenealkylene, ureylene-alkylene and combinations thereof.

Preferred linking groups Q for Formula IV are selected from the group consisting of alkylene (preferably containing 2 to 20, more preferably 2 to 10 carbon atoms), oxyalkylene (preferably containing 2 to 20 carbon atoms and 1 to 10 oxygen atoms) and carbonyloxyalkylene (preferably containing 3 to 20 carbon atoms).

Examples of compounds according to formula (IV), wherein L is a free radically polymerizable group include vinyltrichlorosilane, vinyltrimethoxysilane, vinyltriethoxysilane and alkoxysilane functionalised acrylates or methacrylates, such as methacryloyloxypropyl trimethoxysilane.

The presence of such reactive functional groups, preferably reactive unsaturated groups in the corresponding polycondensates is advantageous in that following the coating of the composition onto a substrate a two-fold curing can be carried out, i.e. a thermal or photochemically induced linking of the unsaturated organic radicals through radical polymerization and a thermal completion of the polycondensation (e.g. by elimination of water from groups M-OH still present). In the case an unsaturated compound is used, additionally a catalyst should typically be present for the thermal and/or photochemically induced curing of the coating composition applied onto a suitable substrate. Particularly preferred is the addition of a photopolymerization initiator. Such initiators are commercially available and include e.g. Irgacure® 184 (1-hydroxycyclohexyl phenyl ketone), Irgacure®500 (1-hydroxycyclohexyl phenyl ketone, benzophenone), and other photo-initiators of the Irgacure®-type available from Ciba-Geigy; Darocur®-type photoinitiators, available from Merck, benzophenone and the like.

Examples of optionally employed thermal initiators are known to those skilled in the art and include, among others, organic peroxides in the form of diacyl peroxides, peroxydicarbonates, alkyl peresters, dialkyl peroxides, perketals, ketone peroxides and alkyl hydroperoxides. Specific examples of such thermal initiators are dibenzoyl peroxide, tert-butyl perbenzoate and azobisisobutyronitrile. These initiators are added to the coating composition in amounts known to one skilled in the art. Typically the initiator will be added in an amount between 0.1 and 2% by weight, based on the compounds according to formula IV.

The compositions may further contain additives that provide the coating with additional properties, such as antimicrobial properties. Examples include $[C_{18}H_{37}N\ (CH_3)_2(CH_2)_3Si(OCH_3)_3]^+Cl^-$. However, the addition of ionic hydrolysing the hydrolysable groups present in the components and carrying out additives is preferably kept below about 10% by weight, in order not to adversely affect the water repellency properties of the composition.

According to the present invention, it is preferred that the weight ratio of compounds (A) to compounds (B) in the fluorochemical composition is 1:1 to 1:20 and particularly preferred 1:1 to 1:10. The composition of the present invention comprises a substantial amount of component (B), i.e. an amount greater than a catalytic amount. Typically, component (B) comprises more than 10 weight percent and more preferably more than 25 weight percent based on the total weight of the components used. In a particularly preferred embodiment, component (B) comprises more than 50 weight percent based on the total weight of the components used. Compound (C) can be used between 0 and 50%, preferably between 0 and 35% by weight, based on the total weight of the components used.

While the benefits of reacting components A and B (optionally with C) extend over a wide range of compositions, good initial repellency is achieved for coatings despite relatively low levels of the fluorochemical polyether silane (component A). Therefore a preferred embodiment of this invention employs the relatively expensive fluorosilane at 5–20% wt. %, giving an economic advantage to the compositions of this invention over other fluorinated coatings. Additionally, compositions of 5–20 wt. % component A were quite surprisingly more durable in maintaining repellency after abrasion of a coated surface.

In one embodiment, a composition comprising components (A) and (B) and optionally (C), sufficient solvent, water, and acid or base catalyst may be combined and coated onto a suitable substrate. When such a coating is applied to the substrate shortly after its preparation, components (A) and (B) and optionally (C) will generally not have undergone a condensation reaction or if condensation has occurred the amount thereof will be low. Generally, the amount of condensation that takes place prior to coating will depend on the concentration and nature of components (A) and (B) and optionally (C), the temperature and the time between preparation of the coating composition and the coating of the substrate. Generally, the coating composition will contain components (A) and (B) each in amounts between 0.01% by weight and 5% by weight and the coating is typically applied within about 3 to 8 hours from its preparation. The present invention however does not exclude the possibility of coating a composition in which partial condensates have formed. Typically, compositions comprising partial condensates may form when the aforementioned coating composition is left for some time before coating, for example for more than 1 hour. Nevertheless, the coating composition should be applied to the substrate before the condensation reaction proceeds towards completion.

Preferably, the amount of water will be between 0.1 and 20% by weight of the total composition, more preferably between 1 and 10% by weight. In addition to water, an organic or inorganic acid or base catalyst should preferably be used in the coating composition.

Organic acid catalysts include acetic acid, citric acid, formic acid, triflic acid, perfluorobutyric acid and the like. Examples of inorganic acids include sulphuric acid, hydrochloric acid and the like. Examples of useful base catalysts include sodium hydroxide, potassium hydroxide and triethylamine. The acid or base catalyst will generally be used in amounts between about 0.01 and 10%, more preferably between 0.05 and 5% by weight of the total composition.

The composition of the present invention typically includes one or more organic solvents. The organic solvent or blend of organic solvents used must be capable of dissolving a mixture of compounds (A), (B) and optionally (C) and any partial condensate that may form as a result of partial condensation of (A), (B) and optionally (C). Preferably, the organic solvent or blend of organic solvents used is capable of dissolving at least 0.01% of compounds (A), (B), (C) and/or partial condensates thereof. Furthermore, the solvent or mixture of solvents preferably has a solubility for water of at least 0.1%, preferably 1% by weight and a solubility for the acid or base catalyst of at least 0.01%, preferably 0.1% by weight. If the organic solvent or mixture of organic solvents do not meet these criteria, it may not be possible to obtain a homogeneous mixture of the fluorinated polycondensate, solvent(s), water and catalyst.

Suitable organic solvents, or mixtures of solvents can be selected from aliphatic alcohols (preferably containing 1 to 6 carbon atoms), such as methanol, ethanol, isopropylalcohol; ketones such as acetone or methyl ethyl ketone; esters, such as ethyl acetate, methylformate and ethers, such as diethyl ether. Particularly preferred solvents include ethanol and acetone.

Fluorinated solvents may be used in combination with the organic solvents in order to improve solubility of the starting compounds and/or the partial condensate. Such fluorinated solvents will generally not be suitable for use on their own because they will generally not meet the requirements of solubility for water and acid or base unless they additionally contain hydrophilic groups such as $CF_3CH_2OH$.

Examples of fluorinated solvents include fluorinated hydrocarbons, such as perfluorohexane or perfluorooctane, available from 3M; partially fluorinated hydrocarbons, such as pentafluorobutane, available from Solvay, or $CF_3CFHCFHCF_2CF_3$, available from DuPont; hydrofluoroethers, such as methyl perfluorobutyl ether or ethyl perfluorobutyl ether, available from 3M. Various blends of these materials with organic solvents can be used.

The composition comprising the compounds (A), (B), optionally (C) and/or partial condensates thereof is generally applied to the substrate in amounts sufficient to produce a coating that is water and oil repellent. This coating can be extremely thin, e.g. 1 to 50 molecular layers, though in practice a useful coating may be thicker.

Suitable substrates that can be treated in a particularly effective way with the composition of this invention include substrates having a hard surface that preferably has groups capable of reacting with the compounds (A), (B), optionally (C) and/or partial condensates. Particularly preferred substrates include ceramics, glass, metal, natural and man-made stone, thermoplastic materials (such as poly(meth)acrylate, polycarbonate, polystyrene, styrene copolymers, such as styrene acrylonitrile copolymers, polyesters, polyethylene terephthalate), paints (such as those on acrylic resins), powder coatings (such as polyurethane or hybrid powder coatings), inox, chromated steel and wood. Various articles can be effectively treated with the fluorochemical solution of the present invention to provide a water and oil repellent coating thereon. Examples include ceramic tiles, bathtubs or toilets, glass shower panels, construction glass, various parts of a vehicle (such as the mirror or windscreen), glass, and ceramic or enamel pottery materials.

Treatment of the substrates results in rendering the treated surfaces less retentive of soil and more readily cleanable due to the oil and water repellent nature of the treated surfaces. These desirable properties are maintained despite extended exposure or use and repeated cleanings because of the high degree of durability of the treated surface as can be obtained through the compositions of this invention.

To effect the treatment of a substrate, the composition as disclosed above, is applied to the substrate. The amount of compounds (A), (B), optionally (C) and/or partial condensates to be coated on the substrate will generally be that amount sufficient to produce a coating which is water and oil repellent, such a coating having at 20° C. a contact angle with distilled water of at least 80°, and a contact angle with n-hexadecane of at least 40°, measured after drying and curing of the coating.

Preferably, the substrate should be clean prior to applying the compositions of the invention so as to obtain optimum characteristics, particularly durability. That is, the surface of the substrate to be coated should be substantially free of organic contamination prior to coating. Cleaning techniques depend on the type of substrate and include, for example, a solvent washing step with an organic solvent, such as acetone or ethanol.

The coating composition is typically a relatively diluted solution, containing between 0.01 and 5 percent by weight of compounds (A), (B), optionally (C) and/or partial condensates, more preferably, between 0.03 and 3 percent by weight, and most preferably, between 0.05 and 2 percent by weight.

In accordance with a preferred embodiment, compositions for application to a substrate are prepared by diluting a concentrate comprising a solution of compounds (A), (B) and optionally (C) in an organic solvent that is substantially free of water. Dilution of the concentrate may be effected by adding thereto further organic solvent. To the mixture is also added water and optionally an acid or base catalyst to obtain the coating composition. Preferably, the concentrate from which the coating composition is prepared contains compounds (A) and (B) in their desired weight ratio to each other. In this respect, it has been found that homogeneous concentrates are preferably prepared with compounds (A) that have an alkoxy group of 2 to 4 carbon atoms as the hydrolysable groups on the silyl group. It was found that such compound more easily allow for the preparation of concentrates in which the weight ratio of compounds (B) to compounds (A) is for example between 3:1 to 12:1, preferably 6:1 to 9:1. High weight ratios may be desired in cases where a high UV stability is desired, i.e. where it is desired that the repellency properties are maintained well when the coating is exposed to UV and humidity. On the other hand, lower weight ratios, for example 1:1 to 6:1 may be desired in case transparency of the coating is critical, such as for example when coating on glass.

A wide variety of coating methods can be used to apply a composition of the present invention, such as brushing, spraying, dipping, rolling, spreading, and the like. A preferred coating method for application of the coating composition of the present invention includes spray application. An airless spray application will typically be preferred in cases where transparency of the coating is important. A substrate to be coated can typically be contacted with the treating composition at room temperature (typically, about 15° C. to about 30° C.). Alternatively, the mixture can be applied to substrates that are preheated at a temperature of for example between 30° C. and 150° C. This is of particular interest for industrial production, where e.g. ceramic tiles can be treated immediately after the baking oven at the end of the production line. Following application, the treated substrate can be dried and cured at ambient or elevated temperature, e.g. at 40° to 300° C. and for a time sufficient to dry and cure. The coating compositions of the present invention generally do not require subjecting the compositions to an elevated temperature. Thus, repellent and durable coatings in connection with this invention can be readily obtained upon coating and drying at ambient temperature. Alternatively, in addition with a thermal treatment, the coating composition may be cured by irradiation (e.g. by means of UV-irradiators, a laser, etc.) in a manner known per se, depending on the type and presence, respectively of an initiator. The process may also require a polishing step to remove excess material.

The following examples further illustrate the invention without the intention however to limit the invention thereto. All parts are by weight unless indicated otherwise.

1. Synthesis of Fluorinated Polyether Disilanes

A. Fluoropolyetherdisilane FES-1:

FES-1 was prepared by reacting perfluoropolyetherdiester $CH_3OC(O)CF_2O(CF_2O)_{9-11}(CF_2CF_2O)_{9-11}CF_2C(O)OCH_3$ (with average molecular weight of about 2000), commercially available from Ausimont, Italy, under the trade designation Fomblin™ Z-DEAL, with 3-aminopropyl-trimethoxysilane, available from Aldrich Co., Milwaukee, Wis., as taught in U.S. Pat. No. 3,810,874 (Mitsch et al.), table 1, line 6. The exothermic reaction proceeded readily at room temperature, simply by mixing the starting materials. The progress of the reaction was monitored by infrared analysis.

B. Fluoropolyetherdisilane FES-2:

FES-2 was prepared by reacting perfluoropolyetherdiester Fomblin™ Z-DEAL, with 3-aminopropyltriethoxysilane, available from Aldrich Co. Milwaukee, Wis., essentially as taught in U.S. Pat. No. 3,810,874 (Mitsch et al.), table 1, line 6. The exothermic reaction proceeded readily at room temperature, simply by mixing the starting materials. The progress of the reaction was monitored by infrared analysis.

C. Preparation of FES-3:

The hydrocarbon, organic starting material $CH_3OCOC_2H_4O(CH_2)_6OC_2H_4COOCH_3$ was prepared by base-catalyzed Michael addition of 1,6-hexanediol (Aldrich, Milwaukee, Wis.) to two equivalents of acrylonitrile, followed by acid-catalyzed methanolysis. The methyl ester was directly fluorinated with $F_2$ to produce the perfluorinated derivative $CF_3OCOC_2F_4O(CF_2)_6OC_2F_4COOCF_3$. The method followed was essentially that found in U.S. Pat. No. 5,578,278 (Fall et. al.). The crude perfluorinated ester was treated with 150 mL of 14% $BF_3$ in methanol and agitated vigorously for 24 hrs. The mixture was washed with water and dried over $MgSO_4$ and distilled (100–110° C.@0.3 torr) to yield $CH_3OCOC_2F_4O(CF_2)_6OC_2F_4COOCH_3$. $CH_3OCOC_2F_4O(CF_2)_6OC_2F_4COOCH_3$ was further reacted with two equivalents of 3-aminopropyltriethoxysilane (available from Gelest, Inc, Tulleytown, Pa.) in ethanol. The reaction was followed by infrared analysis, and when complete, the solvent was stripped on a rotary evaporator to yield a colorless to light tan fluid $(C_2H_5O)_3Si(CH_2)_3NHC(O)C_2F_4O(CF_2)_6OC_2F_4C(O)NH(CH_2)_3Si(OC_2H_5)_3$ (FES-3).

D. Preparation of FES-4:

The procedure as described for FES-3 was followed, starting with 2,2-dimethyl-1,3-propandiol and acrylonitrile to yield $CH_3OCOC_2H_4OCH_2C(CH_3)_2CH_2OC_2H_4COOCH_3$. Upon direct fluorination, $CF_3OCOC_2F_4OCF_2C(CF_3)_2CF_2OC_2F_4COOCF_3$ was produced. This was reacted with 3-aminopropyltriethoxysilane to yield $(C_2H_5O)_3Si(CH_2)_3NHCOC_2F_4OCF_2C(CF_3)_2CF_2OC_2F_4CONH(CH_2)_3Si(OC_2H_5)_3$ (FES-4).

E. Preparation of FES-5:

Using methods similar to those described in U.S. Pat. No. 5,658,962 (Moore et. al.) tetraethyleneglycol diacetate was fluorinated and methanolyzed to yield $CH_3OCO(CF_2OCF_2)_3 COOCH_3$ (b.p. 70° C./0.5 torr), plus a minor amount of $CF_3OCF_2(CF_2OCF_2)_2CO_2CH_3$ produced by apparent decarboxylation during fluorination. The fluorinated ester was reacted with two equivalents 3-aminopropyltriethoxysilane in ethanol. The reaction was followed by infrared analysis, and when complete, the solvent was stripped on a rotary evaporator to yield a colorless to light tan fluid $(C_2H_5O)_3Si(CH_2)_3NHCO(CF_2OCF_2)_3CONH(CH_2)_3Si(OC_2H_5)_3$ (FES-5).

F. Synthesis of FES-6 to FES-10:

Using methods and techniques as described for the synthesis of FES-3, other perfluoropolyetherdisilanes (FES-6 to FES-10) were prepared starting from the hydrocarbon starting materials (number indicative of number average Mw), as given in table 1. The perfluorinated esters were distilled at a temperature and pressure as given in table 1. Two fractions were obtained from the reaction starting from Polytetramethylene oxide 650. Accordingly, two perfluoropolyetherdisilanes FES-9 and FES-10 were prepared from the same hydrocarbon starting material. F-NMR was used to characterize the % functionality of the perfluorinated ester.

TABLE 1 synthesis of fluorochemical disilane compounds

| FES | Hydrocarbon starting material | Flourinated ester b.p ° C./torr | % functionality | Flourinated ester $M_n$ |
|---|---|---|---|---|
| FES-6 | Polyethyleneglycol 400 diacetate | 110–35/0.05 | 95 | 856 |
| FES-7 | Polyethyleneglycol 600 diacetate | 168–250/1.0 | 93 | 1530 |
| FES-8 | Polytetramethylene oxide 250 | 70–165/0.10 | 97 | 644 |
| FES-9 | Polytetramethylene oxide 650 | 123–165/1.0 | 90 | 950 |
| FES-10 | Polytetramethylene oxide 650 | 165–260/1.0 | 92 | 1470 |

2. Methods of Application

Spray Application

The substrates were cleaned and degreased with acetone and kept at room temperature before coating. Alternatively, the substrates were preheated before coating.

(i) Spray Application With Air

Fluorochemical treating compositions given in the respective examples were applied onto the substrates, by spray application using a spray gun operating with air (Venturi principle).

(ii) Airless Spray Application

The fluorochemical treating composition was supplied to the substrate, by means of a spray gun without the use of air. The composition was sprayed onto the substrates by means of a 730073 SS nozzle (available from Spraying Systems). Coated samples were dried at room temperature or forced-air oven dried at a temperature between 80° C. and 150° C. for 30 minutes. Afterwards, excess product was polished off using a dry or wet paper wipe.

Dip Application (i) One Bath Dip Application: a substrate, cleaned by acetone, was dipped in a bath comprising component (B)(eg. TEOS), fluorochemical polyether disilane, acid, water and ethanol. After removal from the bath, the treated substrate was dried at room temperature for about 20 min. After drying, the excess product was removed using a dry cloth.

(ii) Two Bath Dip Application: a substrate, cleaned by acetone, was dipped in a bath containing component (B) (eg. TEOS). The substrate was air dried at room temperature and then dipped in a second bath comprising fluorochemical polyether disilane, acid, water and ethanol. After removal from the bath, the substrate was dried at room temperature for about 20 min. After drying, the excess product was removed using a dry cloth.

Flow Coating

The fluorochemical treating composition was applied using a syringe or a pipette, across the top of the vertical held substrate. This method is also referred to as curtain coating. After allowing excess solution to drain away, the substrates were placed in an oven at 90° C. for 15 minutes.

3. Testing

Static Contact Angles

The treated substrates were tested for their contact angles versus water and n-hexadecane using an Olympus TGHM goniometer. The values are the mean values of 4 measurements and are reported in degrees. The minimum measurable value for a contact angle was 20. A value<20 meant that the liquid spread on the surface.

Advancing and Receding Contact Angles

Advancing and receding contact angles were measured on nylon film, treated with the fluorochemical disilane composition at about 3% solids, by dip application (one bath). A 85 mm×13 mm rectangular strip of nylon film was cleaned by dipping into methyl alcohol and wiping with a KIMWIPE™ wiper (commercially available from Kimberly-Clark Corp., Neenah, Wis.), taking care not to touch the strip's surface. The strip was allowed to dry for 15 minutes. Then, using a small binder clip to hold one end of the strip, the strip was immersed in the treating solution, and the strip was then withdrawn slowly and smoothly from the solution. The coated film strip was tilted to allow any solution run-off to accumulate at the corner of the strip, and a KIMWIPE™ wiper was touched to the corner to pull away the solution build-up. The coated film strip was allowed to air dry in a protected location for a minimum of 30 minutes and then was cured for 10 minutes at 121° C.

Advancing and receding contact angles were measured using a CAHN Dynamic Contact Angle Analyzer, Model DCA 322 (a Wilhelmy balance apparatus equipped with a computer for control and data processing, commercially available from ATI, Madison, Wis., calibrated using a 500 mg weight). An alligator clip was fastened to a piece of coated film strip about 30 mm long, and the clip and film piece were hung from the stirrup of the balance. A 30 mL glass beaker containing approximately 25 mL of water or n-hexadecane was placed under the balance stirrup, and the beaker was positioned so that the coated film strip was centered over the beaker and its contents, but not touching the walls of the beaker. Using the lever on the left side of the apparatus, the platform supporting the beaker was carefully raised until the surface of water or n-hexadecane was 2–3 mm from the lower edge of the film strip. The door to the apparatus was closed, the "Configure" option was chosen from the "Initialize" menu of the computer, the "Automatic" option was chosen from the "Experiment" menu, and the computer program then calculated the time for a scan. The apparatus then raised and lowered the liquid so that the scan was taken (the advancing angle was measured as the liquid moved up and over the surface, while the receding angle was determined as the liquid moved down and away from the surface of the plastic film). The "Least Squares" option was selected from the "Analysis" menu, and the average receding contact angle was calculated from the scan of the film sample. Three separate films were prepared for each material to be tested as previously described. The 95% confidence interval for the average of the 3 scans was typically about 1.2°. This procedure was repeated for water and n-hexadecane.

Aging Test

Treated glass samples were aged in a QUV-apparatus, following the ASTM-standard G.53-84. UV fluorescent lamps of type UVB-313 were used for the light source.

The test cycle was UV-illumination without humidification for 8 hours at a temperature of about 60° C., followed by humidification without UV-illumination, for 4 hours at a temperature of about 50° C.

Tilt Angle

A treated substrate was placed in a Tilt Angle Instrument. 3 drops or about 100 μliter water were placed on the surface of the treated substrate. The substrate was tilted and the angle at which the drops start rolling off the surface was reported. The values, reported in degrees (°) are the mean values of 3 measurements. The maximum recordable value was 70°.

4. EXAMPLES

Examples 1 to 3 and Comparative Examples C-1 and C-2

In examples 1 to 3, glass was treated in a one bath dip application with a composition containing ethanol (90.0 g), FES-1 (0.1 g), 0.3 N HCL (10.0 g) and TEOS in amounts given in table 2. Comparative Example C-1 was made in the same way, but without the use of TEOS. Comparative Example C-2 was made in a 2-bath dip application: glass was dipped in a bath containing 0.3% TEOS in water. The treated glass was air dried at room temperature and then dipped in a bath containing ethanol (90.0 g), FES-1 (0.1 g), and 0.3 N HCL (10.0 g). After removal from the bath, the glass samples of examples 1 to 3 and C-1 and C-2, were air dried and excess product was removed using a dry cloth. Contact angles for water and n-hexadecane and the tilt angle were measured. The results are listed in table 2.

TABLE 2

Glass treated with fluorochemical disilane and TEOS

| Ex No. | % TEOS | Water Contact Angle (°) Frontside/backside* | Hexadecane Contact Angle (°) Frontside/backside* | WaterTilt Angle (°) |
|---|---|---|---|---|
| 1 | 0.3% TEOS | 109/108 | 70/67 | 53 |
| 2 | 0.6% TEOS | 108/115 | 69/68 | 33 |
| 3 | 0.9% TEOS | 118/118 | 68/68 | 39 |
| C-1 | / | 101/105 | 62/65 | >70 |
| C-2 | 0.3% TEOS | 82/103 | 68/63 | |

Note:
*To rule out any difference between the two surfaces (tin side - air side) of the glass samples, the samples were tested on both sides as indicated by frontside and backside in Table 1. In general, no major difference could be observed between the sides of the treated glass when using the compositions of the invention.

The results as given in table 2 indicate that improved water contact angles were obtained using a one-bath application compared with a two-bath application (examples versus C-2). A one-bath application comprising TEOS especially improved the dynamic water repellency (as reflected by tilt angle) of the treated samples, compared to a one-bath application without TEOS.

Examples 4 to 9

In Examples 4 to 9, glass plates were treated by spray application (with air), with compositions containing 90 g ethanol, 0.3 g or 0.6 g TEOS, 0.1 g FES-1 and 10 g acetic acid (normality as given in table 3). After drying at room temperature, the glass plates were rinsed with water. The results of contact angles are given in table 3.

TABLE 3

Contact angles of glass treated with fluorochemical disilane and TEOS

| Ex No | W % TEOS | HAc (N) | Contact Angle Water | Contact Angle n-Hexadecane |
|---|---|---|---|---|
| 4 | 0.3 | 0.3 | 102/105 | 58/56 |
| 5 | 0.6 | 0.3 | 103/96 | 56/54 |
| 6 | 0.3 | 0.6 | 99/99 | 59/56 |
| 7 | 0.6 | 0.6 | 103/100 | 58/49 |
| 8 | 0.3 | 1 | 107/102 | 57/55 |
| 9 | 0.6 | 1 | 102/102 | 51/51 |

Note:
values reported are frontside/backside

Treated glass with high oil and water repellency was obtained. The results indicated that broad experimental conditions could be used to obtain substrates with good oil and water repellency. The glass samples were not optical clear after treatment.

Example 10 and Comparative Example C-3

In example 10, glass plates were treated by airless spray application with a solution of 90 g ethanol, 0.1 g FES-2, 10 g of a 0.3N acetic acid solution and 0.6 g TEOS. Comparative example C-3 was made without TEOS. After drying under airflow, the glass plates were rinsed with water. The glass plates were dried at room temperature, by airflow. The contact angles for water and n-hexadecane and the tilt angle were measured, initially and after the samples had been abraded by an Erichson cleaning machine, for 2000 cycles using the soft side of a Scotchbrite™ sponge (available from 3M) and water. The results (mean values of 6 measurements) are given in table 4.

TABLE 4 contact angles of glass plates, treated with fluorochemical polyethersilane and TEOS

| | Contact angle water | | Contact angle n-hexadecane | | Tilt angle |
|---|---|---|---|---|---|
| Ex No | Initial | Abrasion | Initial | Abrasion | Initial |
| 10 | 100/94 | 92 | 50/60 | 50 | 24 |
| C-3 | 75/92 | 75 | 45/50 | 45 | 51 |

The results indicated that glass samples with high durable oil and water repellency could be made using fluorochemical silane and TEOS mixtures. High contact angles were made, initially, but also after abrasion, indicating that highly durable coatings were made. The samples treated with a mixture of fluorochemical silane and TEOS not only showed higher static contact angles, but especially much higher dynamic contact angles as was reflected by higher tilt angle. The glass samples, treated by airless spray were optical clear, which was an additional advantage.

Examples 11 to 21

In examples 11 to 21, a mixture of 0.20 g of various fluorochemical disilanes, as indicated in table 5, 1.80 g or 0.20 g TEOS (as indicated in table 5), 1.0 g isopropanol and 10 g of a stock solution containing 700 g of 95% ethanol and 35 g 2N HCl was flow coated onto glass microscope slides. The dynamic and static contact angles were measured. The results are given in tables 5 and 6 respectively.

TABLE 5

Dynamic contact angles of glass plates, treated with fluorochemical disilane/TEOS

| Ex No | FES | FES/TEOS | Contact Angle Water Advancing/receding | Contact Angle n-Hexadecane Advancing/receding |
|---|---|---|---|---|
| 11 | FES-3 | 10/90 | 111/92 | 62/50 |
| 12 | FES-4 | 10/90 | 104/92 | 62/50 |
| 13 | FES-5 | 10/90 | 102/83 | 58/42 |
| 14 | FES-7 | 10/90 | 123/111 | 72/65 |

TABLE 6

Static contact angles of glass plates, treated with fluorochemical disilane/TEOS

| Ex No | FES | FES/TEOS | Contact Angle Water | Contact Angle n-hexadecane |
|---|---|---|---|---|
| 15 | FES-3 | 50/50 | 105 | 63 |
| 16 | FES-4 | 50/50 | 100 | 57 |
| 17 | FES-5 | 50/50 | 99 | 62 |
| 18 | FES-6 | 50/50 | 116 | 72 |
| 19 | FES-8 | 10/90 | 99 | 60 |
| 20 | FES-9 | 10/90 | 105 | 63 |
| 21 | FES-10 | 10/90 | 102 | 61 |

The results of both dynamic and static contact angles indicated that substrates, treated with a mixture comprising TEOS and fluorochemical disilanes, obtained by direct fluorination and having different repeating units, had good oil and water repellency.

Examples 22 to 51

Examples 22 to 51 were made to evaluate the stability of concentrated mixtures of fluorinated disilane and compound B. Therefore, mixtures were made of 4 parts FES-1 or 4 parts FES-2 with different amounts of TEOS or methyl triethoxysilane (MTEOS, available from Aldrich Co) and different water free (<100 ppm water) solvents. The composition of the mixtures is given in tables 7 (FES-1) and 8 (FES-2). All mixtures were clear after preparation. The mixtures were kept at room temperature during 3 days and were then evaluated for their stability. The results are listed in Tables 7 and 8.

TABLE 7

Stability of concentrated mixtures of FES-1 and TEOS in solvent

| Ex No | Solvent | Parts Solvent | Parts TEOS | % FC solids | Appearance |
|---|---|---|---|---|---|
| 22 | Ethanol | 2 | 2 | 50 | Clear |
| 23 | Ethanol | 4 | 2 | 40 | Clear |
| 24 | Ethanol | 2 | 4 | 40 | Clear |
| 25 | Ethanol | 4 | 4 | 33 | Clear |
| 26 | Ethanol | 2 | 6 | 33 | Clear |
| 27 | Ethanol | 2 | 8 | 28.5 | Clear |
| 28 | Ethanol | 4 | 8 | 25 | 2 phases |
| 29 | Ethanol | 2 | 10 | 25 | 2 phases |
| 30 | MIBK | 2 | 4 | 40 | Clear |

TABLE 7-continued

Stability of concentrated mixtures of FES-1 and TEOS in solvent

| Ex No | Solvent | Parts Solvent | Parts TEOS | % FC solids | Appearance |
|---|---|---|---|---|---|
| 31 | MEK | 2 | 4 | 40 | Clear |
| 32 | Acetone | 5.3 | 4 | 30 | Clear |
| 33 | Acetone | 2 | 2 | 50 | Clear |
| 34 | Acetone | 2 | 4 | 40 | Clear |
| 35 | Acetone | 2 | 10 | 25 | Sediment |
| 36 | Acetone | 1 | 0.3 | 75 | Clear |
| 37 | t-butylacetate | 2 | 4 | 40 | Clear |

The results indicated that stable high concentrated mixtures could be made from FES-1/TEOS/Solvent. These stable concentrates could be used to make the diluted application baths to treat the glass.

TABLE 8

Stability of concentrated mixtures of FES-2 with TEOS or MTEOS in solvent

| Ex No | Solvent | Parts solvent | Parts TEOS | % FC solids | Appearance mixture |
|---|---|---|---|---|---|
| TEOS | | | | | |
| 38 | Ethanol | 2 | 2 | 50 | Clear |
| 39 | Ethanol | 4 | 2 | 40 | Clear |
| 40 | Ethanol | 2 | 8 | 28.5 | Clear |
| 41 | Ethanol | 2 | 10 | 25 | Clear |
| 42 | Ethanol | 2 | 14 | 20 | Clear |
| 43 | Ethanol | 2 | 24 | 13.3 | Clear |
| 44 | Ethanol | 2 | 34 | 10 | Slightly hazy |
| 45 | Ethanol | 2 | 74 | 5 | 2 phases |
| 46 | MEK | 2 | 14 | 20 | Clear |
| 47 | Acetone | 2 | 10 | 25 | Clear |
| 48 | Acetone | 2 | 34 | 10 | Slightly hazy |
| Methyl triethoxy silane (MTEOS) | | | Parts MTEOS | | |
| 49 | Ethanol | 2 | 2 | 50 | Clear |
| 50 | Ethanol | 2 | 10 | 25 | Clear |
| 51 | MEK | 2 | 10 | 25 | Clear |

The data listed in Table 8 illustrate that stable, concentrated mixtures of FES-2 and component (B) in different solvents could be made.

Example 52 and Comparative Example C-4

In example 52, a glass plate was treated in a one bath application with a composition containing 90 g ethanol, 0.1 g FES-1, 10 g 0.3N HCL and 0.6 g TEOS. Comparative example C-4 was treated with a similar mixture, but without TEOS added. The samples were air dried after treatment and the excess product was removed with a dry cloth. Contact angles versus water and n-hexadecane were measured initially and after the samples had been aged during several aging cycles. The results are given in table 9.

TABLE 9

Contact angles of glass treated with fluorochemical disilane/TEOS - aging

| Aging (hours) | Ex 52 Contact angle water | C-4 Contact angle water | Ex 52 Contact angle n-hexadecane | C-4 Contact angle n-hexadecane |
|---|---|---|---|---|
| / | 112 | 103 | 68 | 64 |
| 24 | 105 | 107 | 58 | 60 |
| 48 | 91 | 90 | 52 | 58 |
| 72 | 92 | 90 | 60 | 50 |
| 96 | 92 | 82 | 58 | 57 |
| 168 | 92 | 67 | 59 | 48 |
| 216 | 91 | 77 | 55 | 56 |
| 264 | 93 | 70 | 46 | 48 |
| 360 | 93 | 70 | 50 | 37 |
| 576 | 90 | 72 | 44 | 33 |
| 744 | 75 | 48 | 47 | 26 |
| 912 | 90 | 58 | 48 | 13 |

The results indicated that samples treated with fluorochemical disilane and TEOS exhibit high UV and humidity stability as was reflected by the contact angles, measured after severe UV/humidity aging.

What is claimed is:

1. A composition comprising:
   (A) at least one fluorochemical polyether silane compound of the formula:

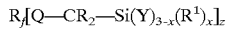

wherein $R_f$ represents a multivalent polyfluoropolyether segment, Q represents an organic divalent linking group, $R^1$ represents a $C_1$-$C_8$ alkyl group, Y represents a hydrolysable group selected from the group consisting of halide groups, alkoxy groups, acyloxy groups, polyoxyalkylene groups and aryloxy groups, R represents hydrogen or an alkyl group of 1 to 4 carbon atoms whereby the R groups may be the same or different, z is 2, 3 or 4 and x is 0 or 1; and
   (B) a substantial amount of one or more non-fluorinated compounds of an element M selected from the group consisting of Si, Ti, Zr, B, Al, Ge, V, Pb, Sn and Zn and having at least two hydrolysable groups per molecule;
   (C) a crosslinking agent of the formula:

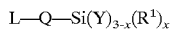

wherein L represents a reactive functional group selected from the group consisting of an amino group, an epoxy group, a mercaptan group, an anhydride group, vinyl ether group, vinyl ester group, allyl ester group, vinyl ketone group, styrene group, vinyl amide group, acrylamide group, maleate group, fumarate group, acrylate group and methacrylate group.

2. A composition according to claim 1 wherein said component (B) is a compound according to the formula:

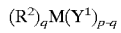

wherein $R^2$ represents a non-hydrolysable group, M represents an element selected from the group consisting of Si, Ti, Zr, B, Al, Ge, V, Pb, Sn and Zn, p is 3 or 4 depending on the valence of M, q is 0, 1 or 2, and $Y^1$ represents a hydrolysable group.

3. The composition according to claim 1, wherein the hydrolysable groups in components (A) and (B) may be the same or different and are independently selected from a halide group, an alkoxy group, an acyloxy group, an aryloxy group or a polyoxyalkylene group.

4. The composition according to claim 1, wherein the polyfluoropolyether segment includes perfluorinated repeating units selected from the group consisting of —($C_nF_{2n}$O)—, —(CF(Z)O)—, —(CF(Z)$C_nF_{2n}$O)—, —($C_nF_{2n}$CF(Z)O)—, —(CF$_2$CF(Z)O)—, and combinations thereof, wherein Z is a perfluoroalkyl group, an oxygen-substituted perfluoroalkyl group, a perfluoroalkoxy group, or an oxygen-substituted perfluoroalkoxy group, all of which can be linear, branched, or cyclic, and have 1 to 9 carbon atoms and 0 to 4 oxygen atoms and wherein n is a number from 1 to 12 inclusive.

5. The composition according to claim 1, wherein the weight ratio of component (A) to component (B) is 1:1 to 1:20.

6. The composition according to claim 1 further comprising water and an acid or base catalyst.

7. The composition according to claim 1 wherein said composition further comprises organic solvent and component (A) is present in an amount between 0.01% by weight and 5% by weight based on the total weight of the composition and component (B) is present in an amount of 0.01% by weight and 5% by weight based on the total weight of the composition.

8. The composition according to claim 1 further comprising an organic solvent and being substantially free of water.

9. The composition of claim 8 comprising organic solvent in an amount of not more than 50% by weight based on the total weight of the composition.

10. The composition of claim 8 wherein the weight ratio of component (A) to component (B) is between 1:1 and 1:9.

11. A composition derived from a partial condensation reaction of a composition as defined in claim 1.

12. A method of treating a substrate comprising applying on at least part of a surface of said substrate a composition as defined in claim 1.

13. Coated substrate obtained by the method of claim 12.

14. A method of making a composition according to claim 1 comprising the steps of:
   (a) providing a mixture of components (A), (B) and (C);
   (b) allowing components (A), (B) and (C) to react to form a partial condensate.

15. A method according to claim 14 further including the step of allowing said substrate to dry at a temperature between 15 and 30° C.

* * * * *

UNITED STATES PATENT AND TRADEMARK OFFICE
CERTIFICATE OF CORRECTION

PATENT NO. : 6,716,534 B2
DATED : April 6, 2004
INVENTOR(S) : Moore, George G. I.

It is certified that error appears in the above-identified patent and that said Letters Patent is hereby corrected as shown below:

Column 5,
Line 65, delete "," before "group".

Column 9,
Line 10, delete "M1" and insert -- $M^1$ --.

Column 10,
Line 62, delete "photoinitiators" and insert -- photo-initiators --.

Column 14,
Line 28, delete "$(CF_2CF_2O)_{911}$" and insert -- $(CF_2CF_2O)_{9-11}$ --.

Column 15,
Line 37, delete "Flourinated" and insert -- Fluorinated --.

Column 21,
Line 29, delete "$R_f[Q-CR_2-Si(Y)_{3-x}(R^1)_x]_z$" and insert -- $R_f-[Q-CR_2-Si(Y)_{3-x}(R^1)_x]_z$ --.
Line 43, after "molecule;" insert -- and --.

Signed and Sealed this

Seventh Day of March, 2006

JON W. DUDAS
*Director of the United States Patent and Trademark Office*